United States Patent [19]

Lee

[11] Patent Number: 4,977,539
[45] Date of Patent: Dec. 11, 1990

[54] HIGH-SPEED SEARCHING APPARATUS FOR CDP

[75] Inventor: Keun C. Lee, Seoul, Rep. of Korea

[73] Assignee: Goldstart Co. Ltd., Seoul, Rep. of Korea

[21] Appl. No.: 277,267

[22] Filed: Nov. 29, 1988

[30] Foreign Application Priority Data

Nov. 30, 1987 [KR] Rep. of Korea ............... 13596/1987

[51] Int. Cl.$^5$ ............................................. G11B 7/00
[52] U.S. Cl. ................................................ 369/44.11
[58] Field of Search ....................... 369/30, 32, 43, 44, 369/46, 44.11, 44.14; 250/234, 233, 231 SE

[56] References Cited

U.S. PATENT DOCUMENTS

| | | | |
|---|---|---|---|
| 4,135,086 | 1/1979 | Baba | 369/32 |
| 4,695,989 | 9/1987 | Kimoto | 369/44 |
| 4,764,914 | 8/1988 | Estes et al. | 369/43 |
| 4,809,251 | 2/1989 | Collomby et al. | 369/32 |

Primary Examiner—Donald McElheny, Jr.

[57] ABSTRACT

A high-speed searching apparatus for a CDP includes an encoder mounted to a rotary shaft of a slide motor for controlling a searching operation of an optical pickup by using a moving distance which is measured by the encoder. The encoder includes a circular rotary plate having slits and a photo sensor having a light emitter and a light receiver. By using the encoder, the high-speed searching can be quickly executed without any influence from RF signal.

7 Claims, 5 Drawing Sheets

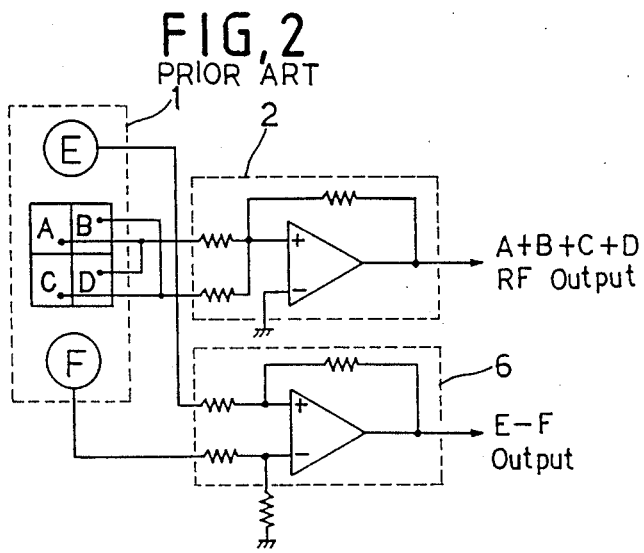
FIG. 2 PRIOR ART
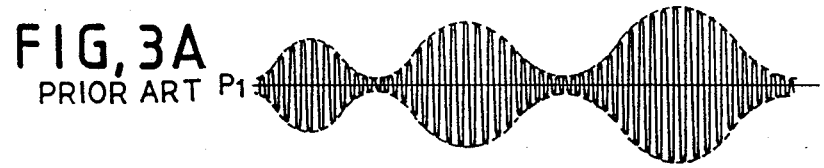
FIG. 3A PRIOR ART P1
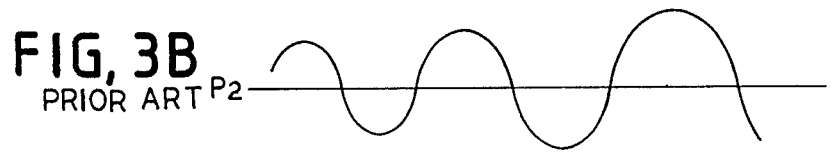
FIG. 3B PRIOR ART P2
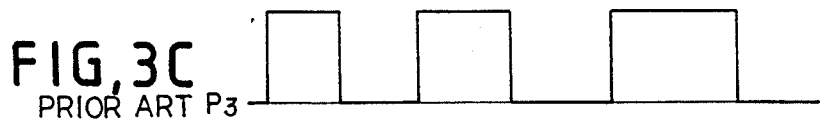
FIG. 3C PRIOR ART P3

HIGH-SPEED SEARCHING APPARATUS FOR CDP

BACKGROUND OF THE INVENTION

1. Field of the Invention

The present invention relates to a high-speed searching apparatus for a compact disc player (hereinafter, referred to as a CDP), and more particularly to a high-speed searching apparatus for controlling a searching operation of a pickup by using the moving distance of an optical pickup which is measured by an encoder mounted to a rotary shaft of a slide motor.

2. Discussion of the Related Art

A conventional high-speed searching apparatus for a CDP includes, as illustrated in FIG. 1, an RF amplifier 2 which amplifies the signals output from optical detectors (A-D) of an optical pickup 1, a low-pass filter 3 through which a lowbandwidth signal passes from the output signals of the RF amplifier 2, bandwidth signal passes, a waveform shaping circuit 4 which shapes the output signal of the low-pass filter 3, a track counter 5 which counts the output signal of the waveform shaping circuit 4 and applies the counted signal to a main processing unit (MPU), an E-F amplifier (6) which amplifies the track error signals output from optical detectors (E-F) of the optical pickup 1, a tracking servo circuit 6 and a tracking drive circuit 7 which generates a drive signal for tracking operation by using the output signal of the E-F amplifier 6, and a slide servo circuit 9 and a slide drive circuit 10 which generate a slide motor drive signal by using a direct current value of the tracking drive circuit 8.

In the drawing, the current sources $I_{TF}$, $I_{TR}$, $I_{SF}$ and $I_{SR}$ are connected to a positive power source VCC. A negative power source VEE supplies the currents for tracking normal direction jump, tracking inverse direction jump, slide normal direction movement and slide inverse direction movement. The currents therefrom are controlled by switches TS1, TS2, SS1 and SS2, respectively.

The reference numeral 11, in FIG. 1, represents a slide motor, numeral 12 represents a worm gear which moves to the left and right according to the rotation of the slide motor 11, and numeral 13 represents a disc.

In FIG. 2, the RF amplifier 2 and the E-F amplifier 6 are illustrated in detail. As shown in FIG. 1, the RF amplifier 2 sums up and amplifies the signals detected at the optical detectors A-D of the optical pickup 1, and the E-F amplifier 6 subtracts and amplifies the signals detected at the optical detectors E,F of the optical pickup 1.

In the above system, the optical detectors E-F of the optical pickup 1, which are necessary parts for the optical pickup apparatus utilizing a three-beam method, are adapted to detect the track error. The optical detectors A-D are adapted to detect a main beam reflected from a disc, and the total magnitude of the signals detected at the L four optical detectors A-D determines whether or not a pit exists on a disc.

FIGS. 3A to 3C illustrate waveforms for each portion of FIG. 1 where the optical pickup 1 crosses the tracks on the disc 13. FIG. 3A illustrates the output waveforms of the RF amplifier 2, wherein the envelopes represent the waveforms generated when the optical pickup 1 passes over the tracks, and the high-frequency components within the envelopes result from the pits on the tracks. FIG. 3B illustrates the waveforms from the RF amplifier 2 which are filtered by the low-pass filter 3, and FIG. 3C illustrates the waveforms from the low-pass filter 3 which are shaped by the waveform shaping circuit 4. In the above system, the waveforms output from the waveform shaping circuit 4 are input to a clock terminal of the track counter 5, so that the number of the tracks on which the optical pickup 1 crosses can be counted by the track counter 5.

Generally on a disc 13, a continuous spiral track is formed from the inner periphery to the outer periphery thereof, and the optical pickup 1 moves along the spiral track of the disc 13 at a predetermined linear speed. An absolute time from the predetermined point of the disc 13 to the utmost inner periphery point, it is possible to calculate where a point resides on the track.

The equation for calculating the point is as follows:

$$\frac{\pi(r^2 - r_0^2)}{P} = V_o \cdot t$$

Where,
$r_0$ is a radius of the utmost inner periphery of the portion that information is recorded,
$V_o$ is a linear speed,
$P$ is a track pitch,
$t$ is an absolute time, and
$r$ is a radius of an abitrary point.

Assuming that, for example, $V_o = 1.2$ m/sec, $P = 1.6$ μm, and $r_0 = 25$ mm, $$r = \sqrt{625 + 0.64t} ,$$

the distance r between two points $r_1$, and $r_2$ in accordance with the radius of the disc becomes, $$r = r_2 - r_1, \text{ and}$$

the number of tracks N is represented by $$N = \frac{r_2 - r_1}{P} = \frac{r}{P} .$$

Therefore, it is possible to calculate the number of tracks;

$$N = \frac{r}{P} = \frac{\sqrt{625 + 0.64t}}{P}$$

As a result, the number of the track up to a point that the absolute time lapses from the utmost inner periphery where information is recorded can be calculated by the above mentioned equation.

The searching operation of such a conventional searching apparatus as illustrated in FIG. 1 will be explained, with reference to the flow chart of FIG. 4. Firstly, the number of the track at a point from the utmost inner periphery to the present pickup position is calculated with the absolute time thereof (S1), and the number of the track at a point to be searched is calculated with the absolute time thereof (S2). Then the number of the track to be jumped is calculated by subtracting the former value from the latter value (S3). Thereafter, the switch SS1 is turned on to apply the slide normal direction movement current $I_{SF}$ to the slide drive circuit 10 so that the slide is moved in the normal direction (S4). At this moment, the MPU counts the output of the track counter 5 (S5), and checks continuously whether the slide reaches the half point of the track to be searched (S6). In case that the slide reaches the half point, the switch SS1 is turned off and the switch SS2 is turned on so that the slide reverse direction movement current $I_{SR}$ for the braking operation is applied to the slide drive circuit 10 (S7). After this occurs, the slide moves with a reduced speed towards the track of the point to be searched (S8), and then the operations as above are completed.

FIG. 5 illustrates the searching operation as explained above in detail.

However, in such a conventional searching apparatus, there has been some problems in the that, in case of a high-speed searching operation, the envelope frequency appearing across the track becomes high. Since the magnitude of the RF component within the envelope due to a pit on the track has a fixed value of 3T–11T (where, T is ¼ of a channel clock period, and the channel clock frequency is 4.3218 MHz), the RF component has a frequency of 196 KHz–720 KHz. Accordingly, if the speed of the optical pickup moving across the track is excessively high, the signal of 196 KHz, which is the lowest frequency among the RF signals, cannot be satisfactorily eliminated. In general, the limitation for satisfactorily eliminating the lowest frequency is about 1/10 of the lowest frequency among the RF signals, and the upper limitation of the waveform which is input to the track counter 5 is about 20 KHz.

A conventional disc has about 20,000 tracks therein, and about 1 second is required for searching from the utmost inner periphery to the utmost outer periphery of the disc. Thereby it is difficult to execute a high-speed searching operation.

SUMMARY OF THE INVENTION

Therefore, it is an object of the present invention to provide a high-speed searching apparatus for a CDP which can execute the high-speed searching operation by directly calculating the moving distance of the optical pickup from the number of rotations of the slide motor, without being influenced by the RF signals.

The above object of the present invention is accomplished by providing an encoder mounted to a rotary shaft of a slide motor for detecting the number of rotations of the slide motor which controls the searching operation by directly calculating the moving distance of the optical pickup from the signal detected at the encoder.

BRIEF DESCRIPTION OF THE DRAWINGS

The above and other objects, features and advantages of the present invention will become more apparent from the following detailed description taken in conjunction with the accompanying drawings, wherein:

FIG. 2 is an explanatory circuit diagram of the RF amplifier and the E-F amplifier of FIG. 1;

FIGS. 3A to 3C are waveforms of each portion of FIG. 1 where the pickup searches the track on the disc;

DETAILED DESCRIPTION OF THE PREFERRED EMBODIMENTS

Figure 1:
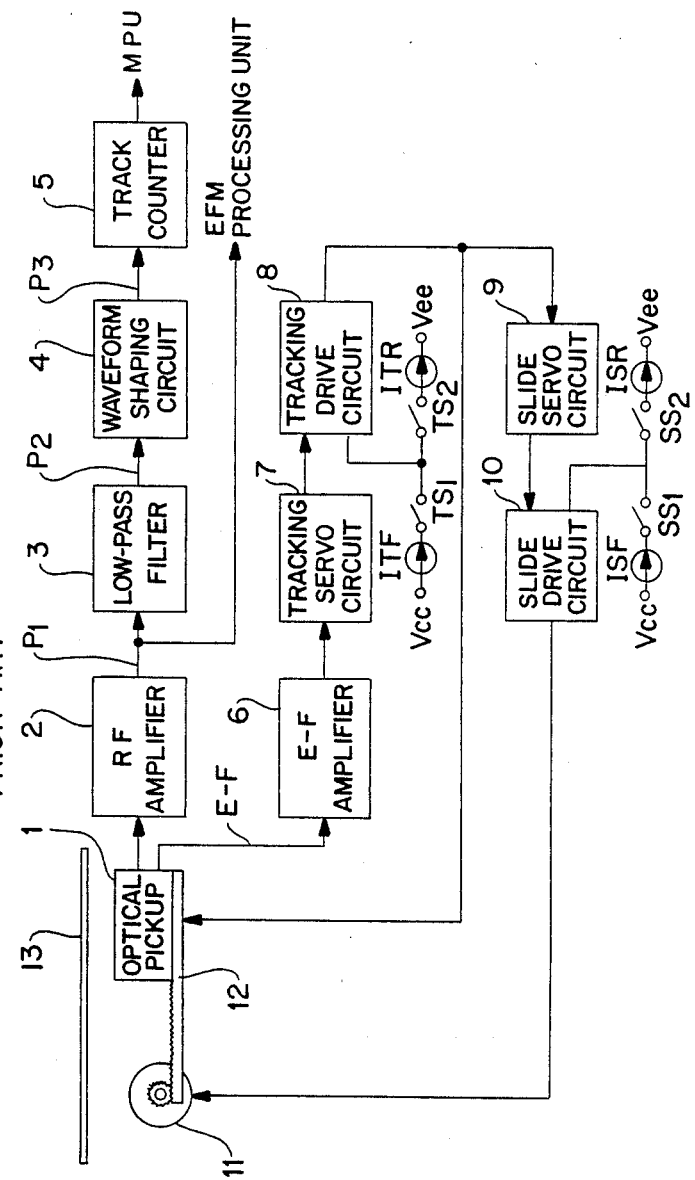
FIG. 1 is a block diagram of a conventional high-speed searching apparatus for a CDP.
Figure 4:
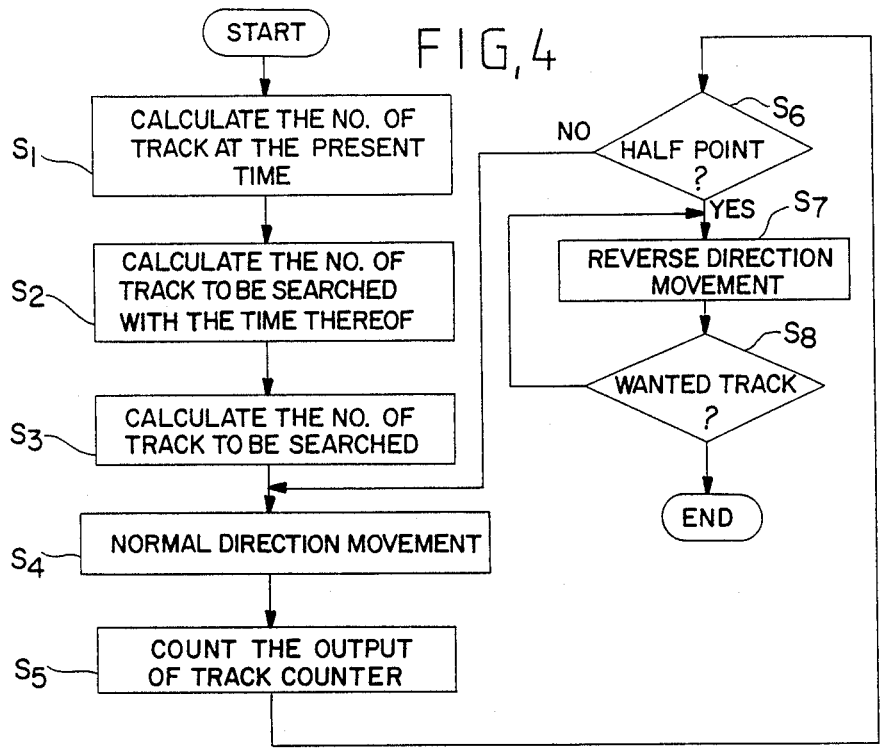
FIG. 4 is a flow chart of the searching operation of FIG. 1.
Figure 5:
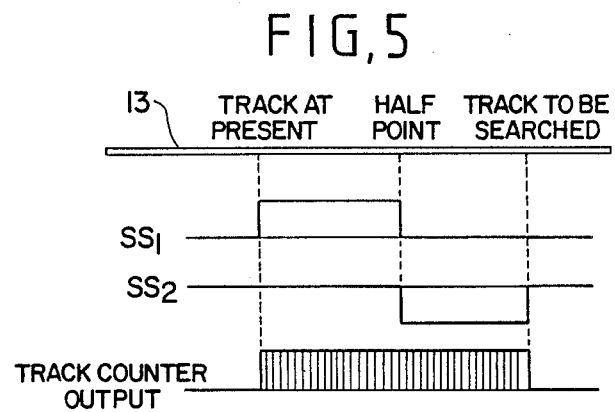
FIG. 5 is a waveform view of the searching operation according to the flow chart of FIG. 4.
Figure 6:
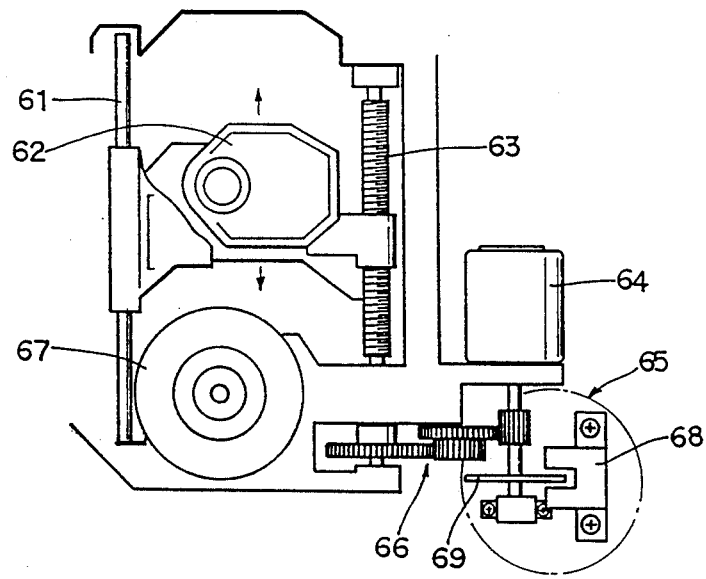
FIG. 6 is an explanatory view illustrating the high-speed searching apparatus according to an embodiment of the present invention with the encoder mounted.
Figure 7:
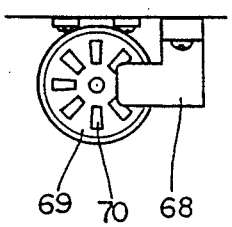
FIG. 7 is a detailed view of the encircled portion of FIG. 6.

Referring to FIG. 6, an encoder 65 which is adapted to an embodiment of the present invention includes a circular shaped rotary plate 69 having slits 70 radially positioned at uniform interval and mounted to a rotary shaft of a slide motor 64 and a photo sensor 68 having a light emitter and a light receiver. The photo sensor 68 is mounted in a manner such that the rotary plate 69 is positioned between the light emitter and the light receiver. In FIG. 6, the reference numeral 61 refers to a guide shaft, numeral 62 refers to an optical pickup, numeral 63 refers to a worm gear, numeral 66 refers to a reduction gears, and numeral 67 shows a spindle turntable.

Figure 8:
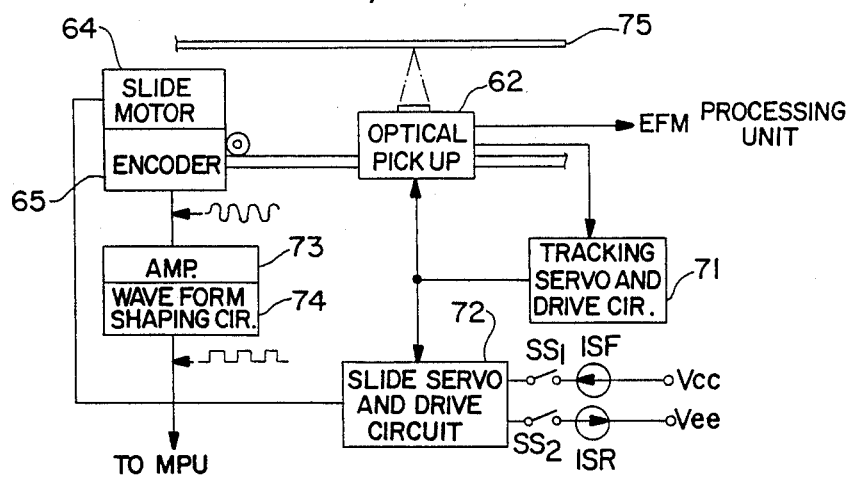
FIG. 8 is a block diagram of the high-speed searching apparatus according to an embodiment of the present invention.

In FIG. 8 the high-speed searching apparatus of the present embodiment is illustrated. The high-speed searching apparatus includes a tracking servo and drive circuit 71 which generates a tracking servo and drive signal in response to receiving a servo signal from the optical pickup 62, a slide servo and drive circuit 72 which generates a slide motor drive signal in response to receiving the tracking servo and drive signal, an amplifier 73 which amplifies the sine wave signal generated at the encoder 65 according to the rotation of the slide motor 64, and a waveform shaping circuit 74 which shapes and outputs the waveform of the output signal of the amplifier 73 to the MPU. In FIG. 8, the current sources $I_{SF}$ and $I_{SR}$ illustrate the currents for slide normal direction movement and slide reverse direction similar to the conventional apparatus as described hereinabove. These currents are controlled by switches SS1 and SS2. Additionally the reference numeral 75 refers to a disc.

Hereinafter, the operation and effect of the present embodiment will be described in detail.

When, a slide motor drive signal is output from the slide servo and, drive circuit 72, the slide motor 64 rotates and the rotational force therefrom causes the worm gear 63 to rotate with a reduced speed by the speed reduction gears 66. Thus, the optical pickup 62 moves along the pickup guide shaft 62. Because the reduction gears 66 having a reduction gear ratio of about 160:1 are generally used and by that the pitch of the worm gear 63 is 1 mm, the optical pickup 62 can be moved by 1 mm per 160 rotations of the slide motor 64. As a result, the amount of movement of the optical pickup 62 for one rotation of the slide motor 64 is 6.25 μm. This amount corresponds to about an amount for four tracks because the track pitch on the disc 75 is 1.6 μm.

Thus, it is possible to obtain the pulse signal proportial to the moving distance of the optical pickup 62 by properly forming the slits 70 of the rotary plate 69 of the encoder 65 in the predetermined intervals.

For example, by forming twenty slits 70 on the rotary plate 69, five pulses are generated at the photo sensor 68 of the encoder 65 when the optical pickup 62 moves one track of the disc 75.

Accordingly, the number of slits 70 of the rotary plate 69 is determined by the reduction gear ratio of the reduction gears 66 and the pitch of the worm gear 63.

Figure 9:
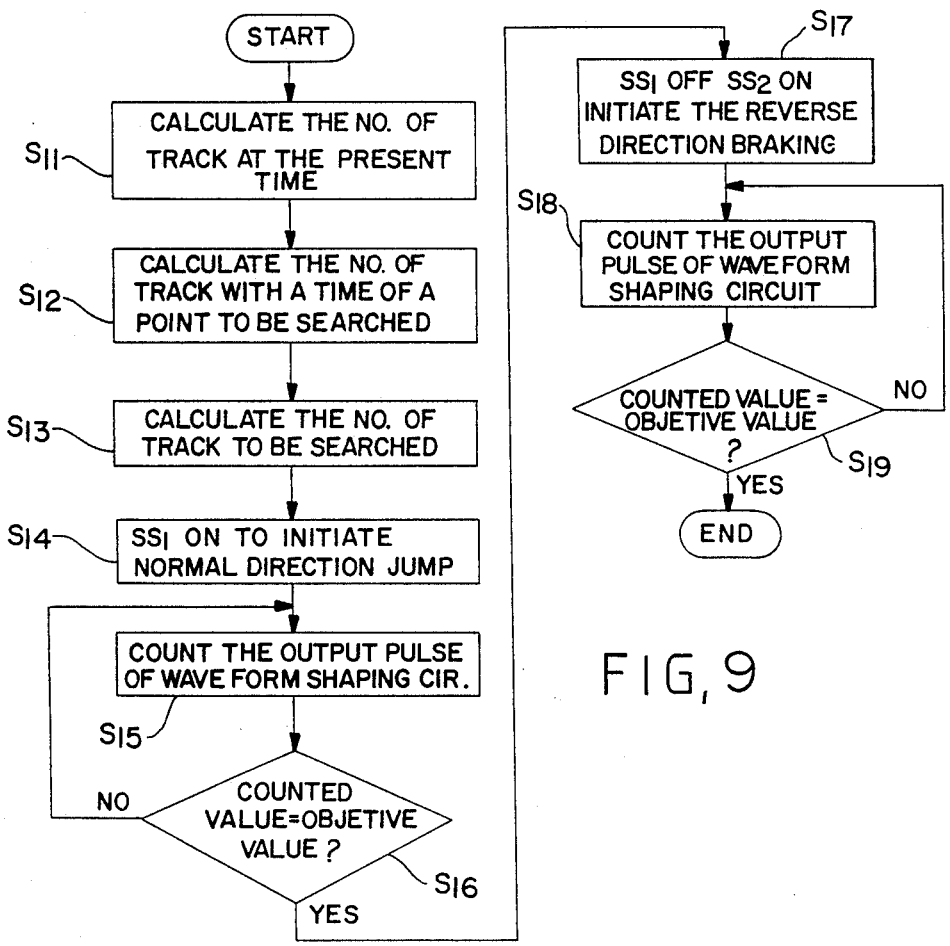
FIG. 9 is a flow chart of the searching operation of FIG. 7.

Next, the high-speed searching operation of the high-speed searching apparatus according to the present embodiment will be described in detail with reference to the flow chart of FIG. 9.

At first, the number of the track at a point from the utmost inner periphery of a disc to the present pickup position is calculated at the MPU with the absolute time of the present pickup position (S11) in a similar way as described hereinbefore. The number of the track at a point to be searched is calculated with the absolute time thereof (S12), and then the number of the track to be jumped is calculated by subtracting the former value from the latter value (S13). Thereafter, the switch SS1 is turned on to supply the slide normal direction movement current $I_{SF}$ to the slide servo and drive circuit 12 so that the slide motor 64 is rotated. Thereby moving the optical pickup (62) is moved in the normal direction (S14).

At this moment, since the MPU calculates the number of track to be jumped, the moving distance is calculated by multiplying the number of the track with the pitch of track (1.6 μm), and the pulse number of the encoder 65 depending upon the movement up to the half moving distance, i.e. an objective value can he calculated.

On the other hand, as the slide motor 64 rotates as mentioned above, the pulse signal is generated and output from the encoder 65. This pulse signal is amplified through the amplifier 73 and shaped out through the waveform shaping circuit 74 and then supplied to the MPU. Thus, the MPU counts the number of pulses which are output from the waveform shaping circuit 74 (S15), and detects whether the counted value is identical to the above objective value (S16). At this moment, if the counted value is identical to the objective value, the switch SS1 is turned off in order to cut off the slide normal direction movement current $I_{SF}$ and the switch SS2 is turned on to supply the slide reverse direction movement current $I_{SR}$ to the slide servo and drive circuit 72 so that the braking operation is executed. Thereafter, the number of pulses, which are generated from the waveform shaping circuit 14, is counted (S18), and the braking is continued until the counted value is identical to the objective value. That is, braking is continued until the optical pickup 62 reaches to the position to be searched (S19). At this moment, if the counted value is identical to the objective value, the switch SS2 is turned off in order to terminate the high-speed searching operation, and normal play operation can be initiated.

As described hereinabove, the high-speed searching apparatus according to the present embodiment has advantages because the moving distance of the optical pickup which depends on the rotation of the slide motor is calculated by providing an encoder mounted to a rotary shaft of a slide motor, without counting the tracks on a disc. Thereby, it is possible to eliminate the influence of RF signals and to execute the high-speed searching far more quickly than in a conventional apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A high-speed apparatus for controlling a search operation of a predetermined position on a disc comprising:
    an optical pickup slidably positioned on a pickup guide shaft above the top surface of the disc for developing a servo signal indicative of the position of said optical pickup;
    a slide motor disposed on a rotary shaft for slidably positioning said optical pickup above the top surface of the disc;
    a tracking servo and drive circuit for outputting a tracking servo and drive signal in response to said servo signal from said optical pickup;
    a slide servo and drive circuit for driving said slide motor in response to said tracking servo and drive signal from said tracking servo and drive circuit;
    encoder means mounted on said rotary shaft of said slide motor for outputting pulse signals according to the rotation of said slide motor;
    amplifier means for developing amplified signals of said pulse signals from said encoder means;
    a waveform shaping circuit for shaping said amplified signals from said amplifier means; and
    a main processing unit for detecting the number of said amplified signals shaped by said waveform shaping circuit and calculating the position of said optical pickup to determine whether said optical pickup is positioned at said predetermined position.

2. The apparatus according to claim 1, wherein said encoder means comprises;
    a rotary plate mounted on said rotary shaft; and
    a photo sensor disposed above the top surface of said rotary plate and below the bottom surface of said rotary plate.

3. The apparatus according to claim 2, wherein said rotary plate comprises a plurality of radial slits positioned at uniform intervals.

4. The apparatus according to claim 2, wherein said photo sensor comprises a light emitter disposed above the top surface of said rotary plate and a light receiver disposed below the bottom surface of said rotary plate.

5. A method for controlling a search operation of a predetermined position on a disc in a high-speed searching apparatus, comprising the steps of;
    (a) slidably positioning an optical pickup along a pickup guide shaft above the top surface of the disc in response to the rotation of a slide motor;
    (b) providing a servo signal indicative of the position of said optical pickup;
    (c) developing a tracking servo and drive signal in response to said servo signal;
    (d) encoding pulse signals according to the rotation of said slide motor;
    (e) amplifying and shaping said pulse signals;
    (f) detecting the number of the signals developed at said step (e);
    (g) calculating the position of said optical pickup corresponding to the number of the signals detected at said step (f);
    (h) comparing the position of said optical pickup calculated at said step (g) to said predetermined position;

(i) repeating said steps (a)-(h) if the position of said optical pickup calculated at said step (g) is different than said predetermined position; and (j) completing the search operation if the position of said optical pickup calculated at said step (g) is equal to said predetermined position.

6. The method according to claim 5, wherein said step (d) encodes said servo signal into said pulse signals in response to a photosensor which detects the position of said optical pickup corresponding to the rotation of said slide motor.

7. The method according to claim 6, wherein said pulse signals are encoded from said servo signal by a plurality of slits formed at predetermined intervals of a rotary plate connected to said slide motor.

* * * * *